United States Patent
Kambhatla et al.

(10) Patent No.: US 6,704,394 B1
(45) Date of Patent: Mar. 9, 2004

(54) SYSTEM AND METHOD FOR ACCESSING VOICE MAIL FROM A REMOTE SERVER

(75) Inventors: Nandakishore Kambhatla, Yonkers, NY (US); Maroun Touma, Bethel, CT (US); Catherine Gody Wolf, Katonah, NY (US); Wlodek Wlodzimierz Zadrozny, Tarrytown, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/047,722

(22) Filed: Mar. 25, 1998

(51) Int. Cl.⁷ ................................................ H04M 1/64
(52) U.S. Cl. ................ 379/67.1; 379/88.04; 379/88.07; 379/88.13; 379/88.16; 379/88.17
(58) Field of Search .......................... 379/67.1, 74, 80, 379/88.01, 88.02, 88.03, 88.04, 88.13, 88.17, 88.22, 93.09, 93.24, 93.25, 93.34, 93.35, 100.08, 100.15, 100.16, 68, 88.05, 88.06, 88.07, 88.16

(56) References Cited

U.S. PATENT DOCUMENTS

| | | | | |
|---|---|---|---|---|
| 5,608,786 A | * | 3/1997 | Gordon ....................... 379/100 |
| 5,652,789 A | * | 7/1997 | Miner et al. ................. 379/201 |
| 5,675,507 A | * | 10/1997 | Bobo, II ................... 364/514 R |
| 5,732,216 A | * | 3/1998 | Logan et al. ........... 395/200.33 |
| 5,742,905 A | * | 4/1998 | Pepe et al. .................... 455/461 |
| 5,768,513 A | * | 6/1998 | Kuthyar et al. ........ 395/200.34 |
| 5,822,405 A | * | 10/1998 | Astarabadi .................... 379/88 |
| 5,838,682 A | * | 11/1998 | Dekelbaum et al. ......... 370/401 |
| 5,884,032 A | * | 3/1999 | Bateman et al. ....... 395/200.34 |
| 5,884,262 A | * | 3/1999 | Wise et al. .................. 704/270 |
| 5,963,618 A | * | 10/1999 | Porter ....................... 379/88.17 |
| 6,233,318 B1 | * | 5/2001 | Picard et al. ............. 379/88.17 |
| 6,246,989 B1 | * | 6/2001 | Polcyn ........................ 704/275 |
| 6,282,270 B1 | * | 8/2001 | Porter ....................... 379/88.17 |
| 6,330,079 B1 | * | 12/2001 | Dugan et al. ............... 358/403 |
| 6,396,907 B1 | * | 5/2002 | Didcock .................. 379/88.17 |

FOREIGN PATENT DOCUMENTS

| | | |
|---|---|---|
| JP | 08-167938 | 6/1996 |
| JP | 09-116633 | 5/1997 |
| JP | 09-135298 | 5/1997 |
| JP | 10-070612 | 3/1998 |

OTHER PUBLICATIONS

"Speech Recognition The Future Now!" edited by M. Koerner, 1996, Prentice Hall ISBN No. 0–13–61890–2.
3 Press Releases from Lotus, Lucent and IDT.

* cited by examiner

Primary Examiner—Allan Hoosain
(74) Attorney, Agent, or Firm—Louis J. Percello, Esq.

(57) ABSTRACT

The invention is directed towards an automated system for extracting voice messages from a voice mail system and for providing unified access to voice mail and electronic mail or voice mail and the internet. For a given user, a voice mail remote access server connects to the user's voice mail system through a telephone or data network, and uses speech recognition and understanding to navigate through the prompts of the voice mail system and extract the user's voice mail. Depending upon the access mechanism preferred by the user, the voice messages are sent as e-mail messages with attachments (audio files) to the user or made accessible to the user's world wide web server or displayed to the user using a stand-alone voice mail player application.

23 Claims, 9 Drawing Sheets

VMS: Hello, welcome to the voice mail system. Please enter your name
User: (presses the keys for her name) — 20
VMS: Please enter your password.
User: (presses the keys for her password)
VMS: Please choose one of the following options. Press 1 to record a message. Press 2 to change your answering options. Press 3 to listen to your messages. — 30
User: (presses the keys for 3)
VMS: You have 2 new messages. Message 1 from Mr. X was received today at four thirty p.m. Press 1 to play this message. Press 2 to go to the next message.
User: (presses the keys for 1)
VMS: (plays the audio stream) "Hi. This is a voice mail message from Mr. X. Please call me back." Press 1 to replay the message. Press 2 to respond to the caller. Press 3 to go to the next message. — 10
User: (presses appropriate key)
VMS: ...

SYSTEM AND METHOD FOR ACCESSING VOICE MAIL FROM A REMOTE SERVER

FIELD OF THE INVENTION

The present invention generally relates to methods of accessing voice mail over telephone or data networks and, more particularly, to a system and a method for accessing voice mail from a remote voice mail server using electronic mail or a web browser or a dedicated voice mail client.

BACKGROUND OF THE INVENTION

DESCRIPTION OF THE PRIOR ART

Figure 1A:
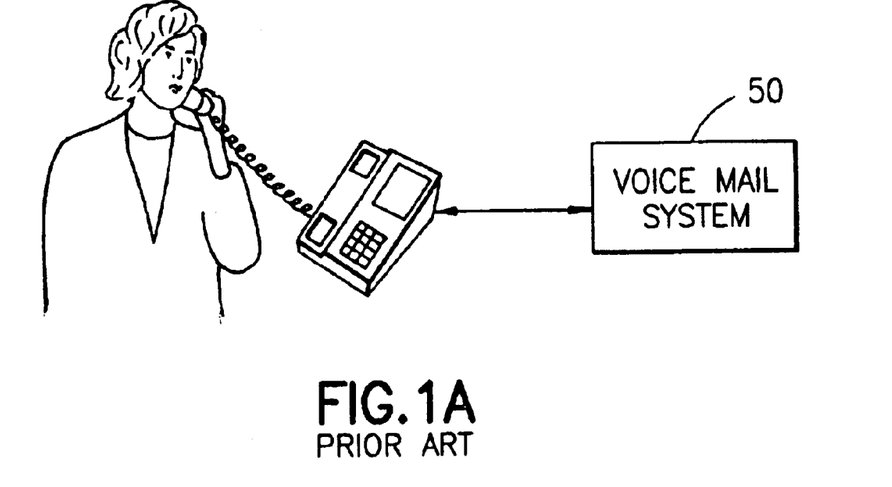
FIG. 1A is a schematic diagram showing a human user accessing her voice mail messages from a prior art voice mail server using a telephone over a telephone network.
Figure 1B:
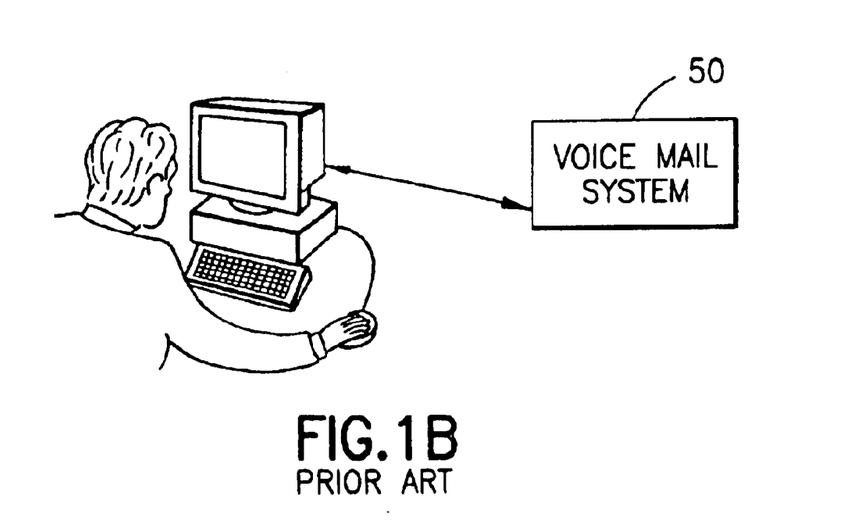
FIG. 1B is a schematic diagram showing a human user accessing his voice mail messages from a voice mail server using a prior art computer system over a data network.

FIGS. 1A and 1B show examples of voice mail systems 50. Voice mail systems 50 enable users to record, manage, retrieve and send spoken voice messages to and from other users. Thus, examples of voice mail systems include both a telephone answering machine and an automated telephone based spoken messaging system for a large corporation. An interactive voice response system which provides spoken voice information to the user over a telephone can also be considered to be a voice mail system. For example, an automated telephone banking system which provides account balances over the telephone can be considered to be a voice mail system.

The telephone is the most common means of accessing and recording voice mail (e.g., the IBM voice mail system). However, some voice mail servers (e.g., the new release of lotus notes) may additionally provide access to voice mail lover a computer data network (e.g., over the internet or an intranet), where the users can give voice mail commands using the keyboard and mouse. FIG. 1A shows a user accessing her voice mail over the telephone and FIG. 1B shows a user accessing his voice mail through the computer.

Figure 1C:
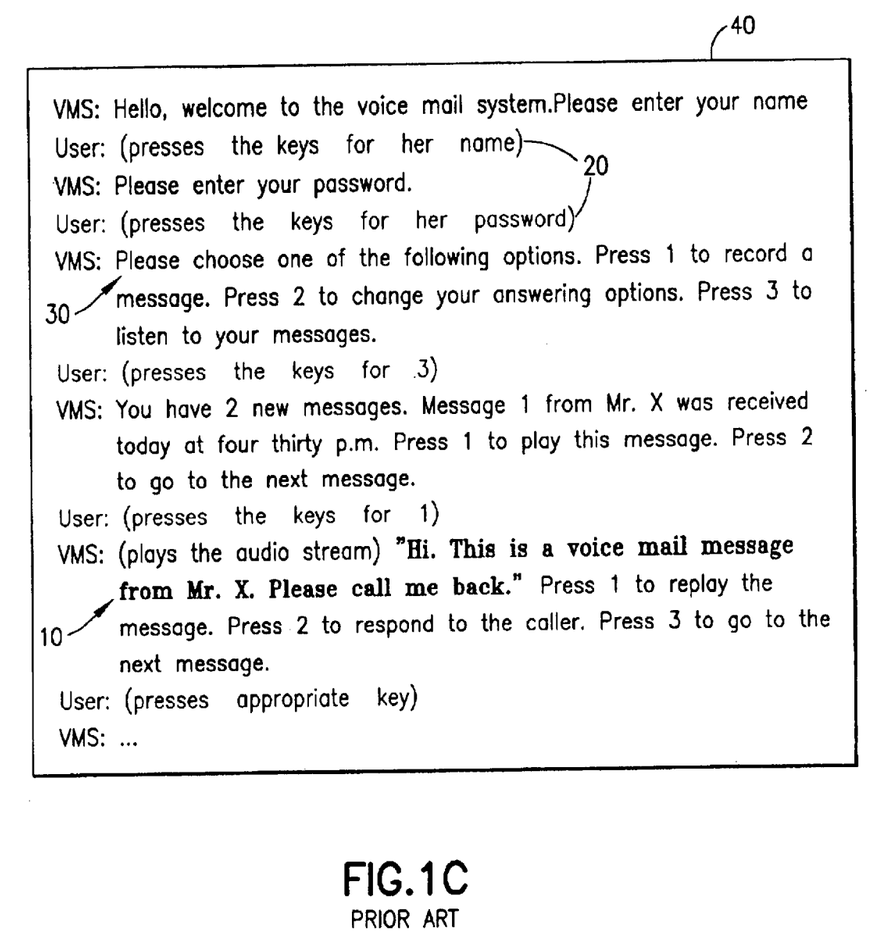
FIG. 1C is a sample mail access session by a user with a prior art voice mail system showing voice prompts played by the voice mail system and the navigation performed by the user.

FIG. 1C shows a typical mail access session 40 of a user with a voice mail system 50 over the telephone. After a user calls her voice mail system, the user authentication 20 is performed by the user entering her name and her password using the dual-tone multi frequency (DTMF) keys on her telephone when prompted to do so by the voice mail system 50. The voice mail system 50 then provides the user with an option of choosing one of a possible set of actions by pressing DTMF keys on the telephone. Dual-tone multi frequency keys (DTMF) are a form of address signaling provided on telephone sets using push-buttons instead of a rotary dial. For instance, in our example, a choice of recording a voice message is indicated by pressing "1" and a choice of listening to the user's voice mail messages is indicated by pressing "3". The directions provided by the voice mail system 50 to the user to navigate through the menu are called voice prompts 30. The user understands the prompts and presses the appropriate DTMF keys to access her voice mail messages 10. FIG. 1C also shows an example of a voice mail message 10 and the process of navigating the voice prompts 30 to extract the message. Thus, the process of extracting the voice mail messages 10 in a mail access session 40 involves a navigation through the voice prompts 30 of the voice mail system 50 until the voice messages 10 are played back.

Some voice mail systems may also provide access to voice mail over a data network (e.g., a TCP/IP connection over the internet). In this method of access, a client computer interacts with the voice mail system using a set of messages in an agreed upon protocol (e.g., TCP/IP) and sends or receives the voice mail as compressed audio files.

The main problem with traditional mail systems is a lack of integration among the different types of messaging that a user access. Thus, a typical business user is forced to use the telephone to access her voice mail, an electronic mail client program on her computer to access her e-mail and a world wide web browser on her computer to access the world wide web.

Another problem is the lack of an automated method to navigate the voice prompts 30 of a traditional voice mail system 50 to extract voice mail messages. Thus, the users are either forced to switch to a more sophisticated voice mail system or to navigate through the prompts manually.

OBJECTS OF THE INVENTION

It is therefore an object of the present invention to provide a system and a method for enabling access to voice mail synchronously or asynchronously from a remote voice mail server through an electronic mail client or a network browser (e.g., a world wide web browser) or a stand alone voice mail client.

It is yet another object of the present invention to provide a system and a method for automatically extracting voice mail messages from a voice mail server using speech recognition and natural language processing technologies by navigating through the voice prompts, for presentation to a user at a later time.

SUMMARY OF THE INVENTION

The invention is directed towards an automated system for extracting voice messages from a voice mail system and for providing unified access to voice mail and electronic mail or voice mail and the internet. For a given user, a voice mail remote access server connects to the user's voice mail system through a telephone or data network, and uses speech recognition and understanding to navigate through the prompts of the voice mail system and extract the user's voice mail. Depending upon the access mechanism preferred by the user, the voice messages are sent as e-mail messages with attachments (audio files) to the user or made accessible to the user's world wide web server or displayed to the user using a stand-alone voice mail player application.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION

Figure 2A:
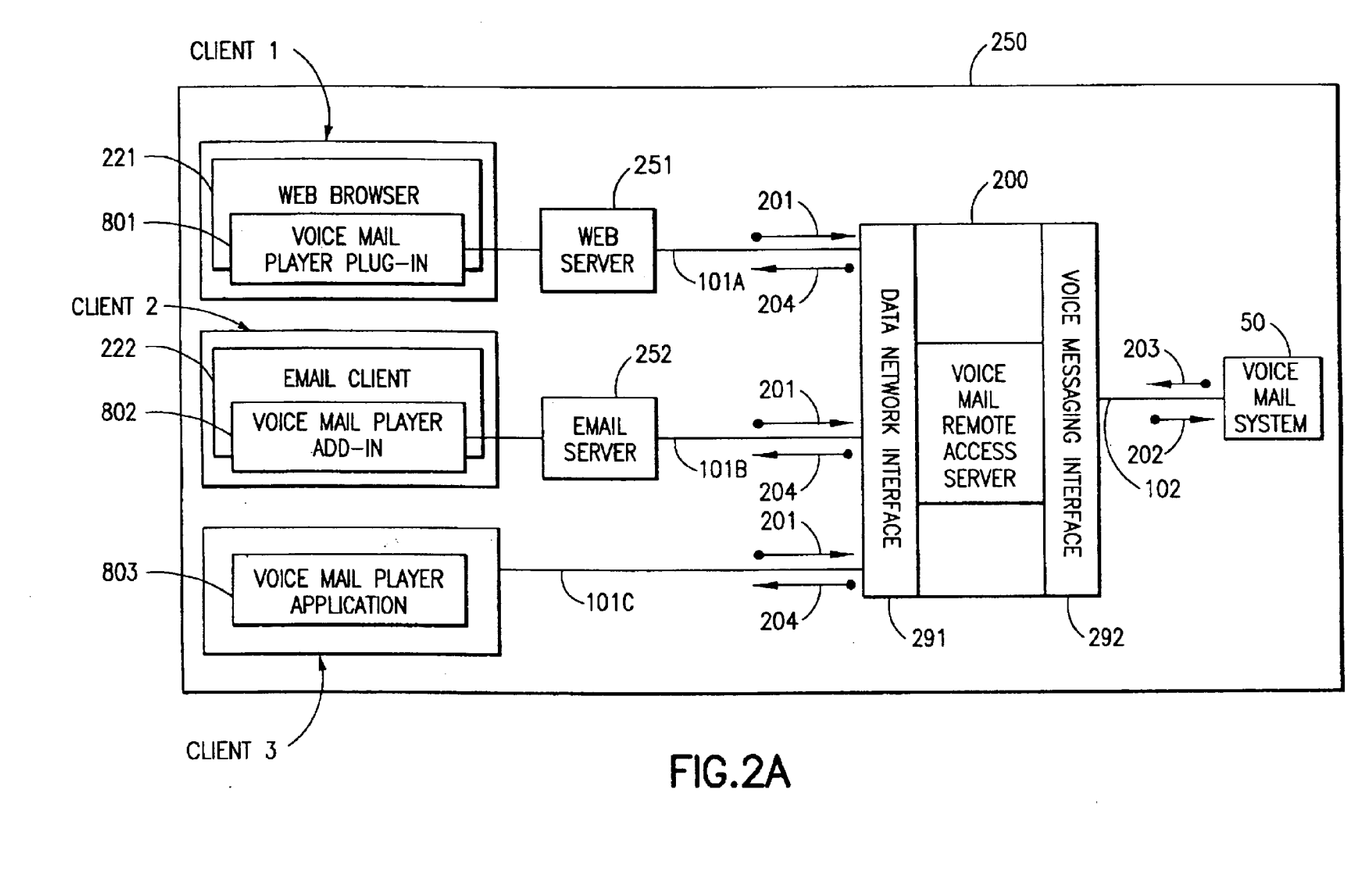
FIG. 2A is a block diagram showing a generalized voice mail access scenario using our invention, where client computers are interacting with a voice mail remote access server (VMRAS) to access voice mail from a voice mail system.

Referring now to the drawings and more particularly to FIG. 2A, there is shown a block diagram of the overall system 250 architecture. Client 1, Client 2 and Client 3 are typical personal computers equipped with a sound card and a network interface, e.g. an IBM Aptiva personal computer or a Packard Bell personal computer. The data network interface 291 is a network card, such as token ring, or a modem for dial-up type connections. The voice messaging interface 292 is a network interface capable of communicating voice mail system commands to the voice mail server. Examples of a voice messaging interface 292 include a telephony network, a digital network connected to a telephony server, a digital internet protocol (IP) network connected to a telephony server, a dedicated RS-232 connection to a telephony server, or a synchronous or asynchronous data communication network connected to a telephony server. All of the data network interfaces and the voice messaging interfaces mentioned above are well known. The users of the computers Client 1, Client 2, and Client 3 access their voice mail through a world wide web browser 221 with a voice mail player plug-in 801 (FIG. 2B), an electronic mail client program 222 with a voice mail player add-in 802 (FIG. 2C), and a separate stand alone voice mail player application 803 (FIG. 2D), respectively. The web browser 221 on Client 1 is connected to the web server 251 over the internet or an intranet. The e-mail client 222 is connected to the e-mail server 252 over the internet or intranet. The Netscape navigator and the Microsoft Internet Explorer are examples of a world wide web browser 221. The Lotus notes client program is an example of an electronic mail client program 222. The web server 251, the e-mail server 252, and the voice mail player application 803 are connected to the Voice Mail Remote Access Server (VMRAS) 200 with data links 101(A,B, and C) respectively. For example, 101A, B, and C can be internet connections or Local Area Network (LAN) connections.

The Voice Mail Remote Access Server (VMRAS) 200 module:

establishes a connection 102 to a voice mail system 50 over the voice messaging interface 292 (a telephone or data network), extracts digitized voice messages 10 from the voice mail system 50, which are received either as an audio stream (if the connection is over the telephone network) or as audio packets 203 (if the connection is over a data network), over the data link 102, sends the digitized voice messages to the client computers Client 1 (through a web server 251), Client 2 (through an e-mail server 252) and/or Client 3 over the data links 101A, 101B, and 101C using voice data packets 204, receives voice control commands (901/201) (to control the voice mail system 50) or input voice messages (904/201) to send to others (see FIG. 4) from the client computers Client 1 (through a web server 251), Client 2 (through an e-mail server 252), and Client 3, sent as voice control packets 201 over the data links 101A, B and C, and sends the voice mail commands 901 or the input voice messages 904 (see FIG. 4) to the voice mail system 50 either as a set of appropriate dual-tone multi frequency (DTMF) keys (if the connection is over the telephone network) or using signal packets 202 (if the connection is over a data network) over the data link 102.

The VMRAS 200 is connected to the voice mail system 50 via a known Computer Telephony Interface (CTI) or a data network interface. This connection, represented as 102 in FIG. 2, is preferably over the telephone network.

The computers Client 1, Client 2, and Client 3 send voice control packets 201 containing voice mail commands 901 to access and control their voice mail, to the voice mail remote access server 200 over the respective data links 101A, 101B, and 101C. The client computers receive voice data packets 204 containing voice mail messages 10 over the data links 101A, 101B, and 101C respectively from the voice mail remote access server 200.

Figure 2B:
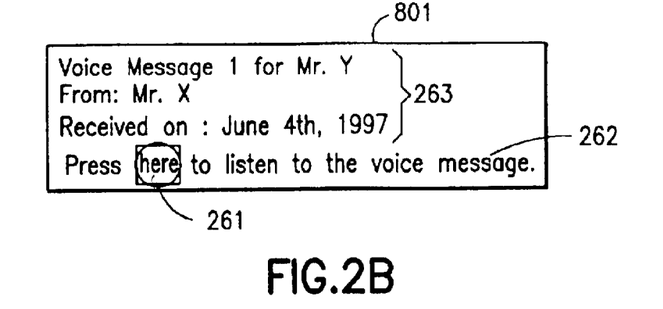
FIG. 2B shows the user interface provided by network browsers with a voice mail player plug-in to enable users to access their voice mail from the world wide web.

The user on Client 1 uses a web server 251 to connect and authenticate herself to the VMRAS 200 and receives her voice mail messages 10 as an audio stream. FIG. 2B shows an embodiment of the user interface of the web page shown to the user by her web browser 221 to enable access to her voice mail. The voice mail player plug-in 801 (FIG. 2B) in the web browser 221 implements a playback function 261 for playing the audio stream, e.g., voice message (10, 262) in real-time as it is being received from the VMRAS 200 and a front-end user interface that allows the client to interact with the voice mail system 50 as if she were using a regular telephone. In one preferred embodiment, a description 263 of the message (10,262) is shown.

Figure 2C:
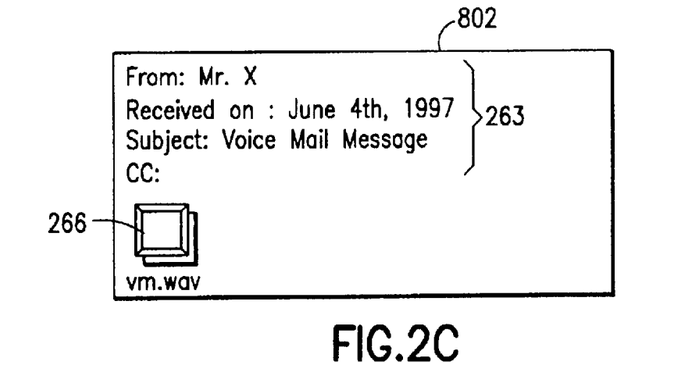
FIG. 2C shows the user interface provided by e-mail clients with a voice mail player add-on to enable users to access their voice mail messages as e-mail messages with attachments.

FIG. 2C shows the user interface provided by the voice mail player add-in 802 in a e-mail client 222 which enables the user on Client 2 to use her electronic mail client 222 to retrieve her voice mail asynchronously from the e-mail server 252. In this case, the VMRAS 200 sends the voice mail messages 10 as standard e-mail attachments (audio files) to the user's mailbox. For example, an embodiment of VMRAS 200 might send the messages 10 as attachments which are wav files or real audio files using standard messaging protocols like SMTP. The voice mail player add-in 802 allows the e-mail client 222 to novelly playback 266 her voice mail messages 10 using the speakers on her computer Client 2. As before, the message can have a descriptor 263.

Figure 2D:
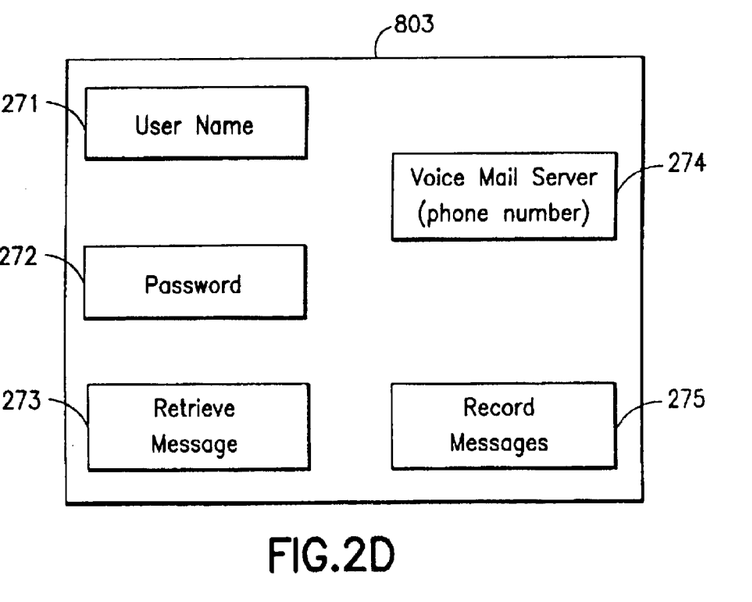
FIG. 2D shows the user interface provided by a voice mail player application to enable users to access their voice mail messages.

FIG. 2D shows the user interface of a voice mail player application 803 on Client 3 which enables a user to access her voice mail. The voice mail player 803 optionally authenticates the user to the VMRAS 200 by providing her user name 271 and password (272, see also 20 in FIG. 1C). The user interface of the voice mail player 803 (FIG. 2D) allows a user to retrieve (button 273) her voice messages 10 and play them back or to record (button 275) and send messages 904 (see FIG. 4) to other users. The voice mail player application 803 could be a Java application that provides similar functions to those described for the Voice Mail Player Plug-in 801. A specific identifier 274 can be provided to the system 250 to enable the system 250 to access any given voice mail system 50. This identifier 274 can be a telephone number or an IP address of a network server.

Figure 3:
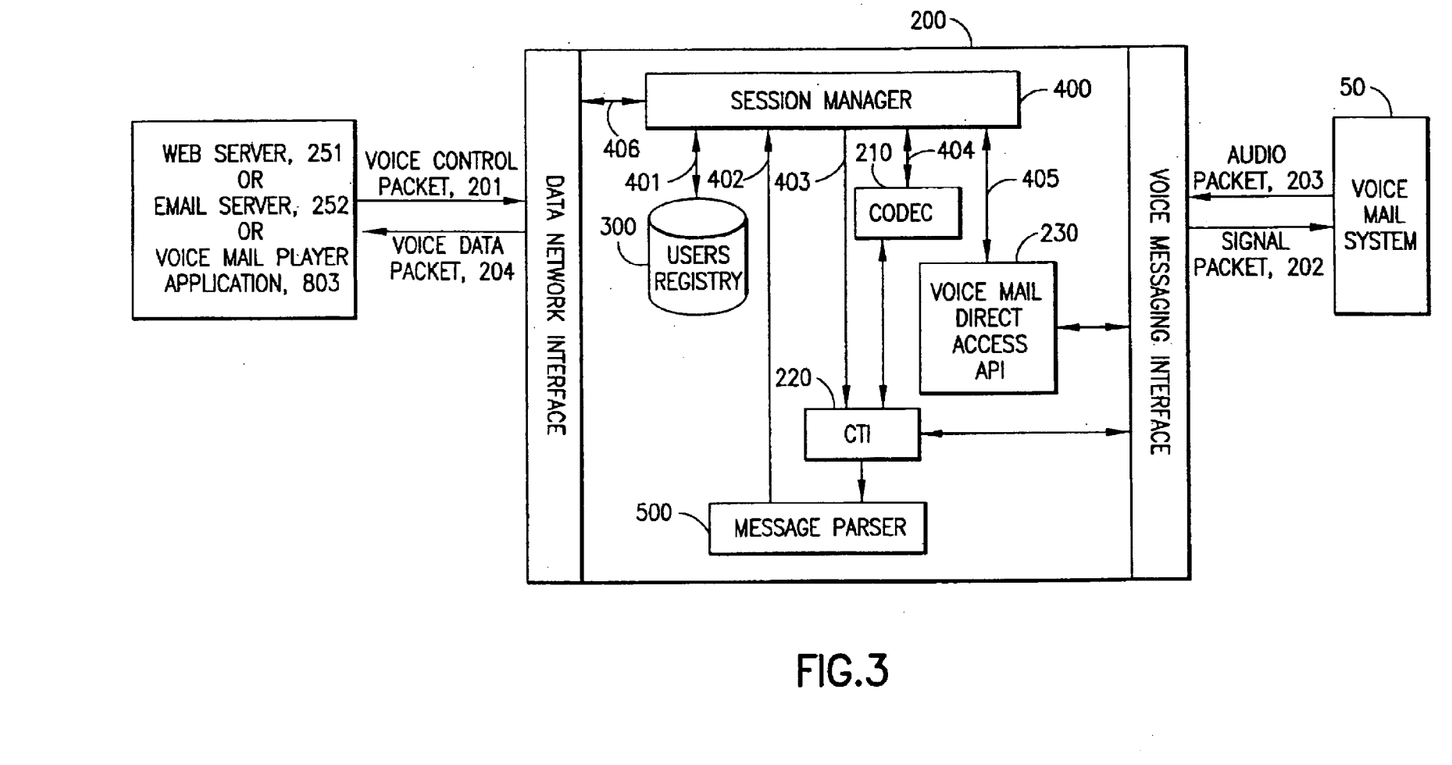
FIG. 3 is a block diagram of the basic components of a voice mail remote access server (VMRAS).

FIG. 3 shows a block diagram of the basic components of a Voice Mail Remote Access Server (VMRAS) 200. The users registry 300 within VMRAS is a database of users 410A and their associated voice mail locations 420A (see FIG. 8). The session manager 400 manages the connections 101A,B,C, with the web server 251, the e-mail server 252 and the client computer Client 3. The connections can be of 2 types: synchronous or asynchronous. A synchronous connection allows users on client computers to listen to their voice mail messages 10 in real-time. An asynchronous connection allows users on client computers to receive their voice mail messages as e-mail attachments. The session manager 400 accesses a user's voice mail locations (420A or 420B) from the users registry 300 (FIG. 8), establishes a connection 102 (FIG. 2A) to the voice mail system 50 using either a voice mail direct access API 230 over a voice messaging interface 492: a data network or a computer telephony interface (CTI) 220 over the telephone network. The voice mail direct access API 230 is based on the voice mail network interface API or the voice mail network operating system API and implements known functions such as: get next voice message, delete voice message, etc. (One example of a voice mail direct access API 230 is IBM's "Direct Talk Mail System" within the DT 6000 telephony product.) The computer telephony interface (CTI) 220 is a hardware or software component that can dial into the voice mail system 50 and send it DTMF tones. The CTI unit 220 uses a known codec 210 to compress digitized voice, if necessary. After establishing a connection 102 between the voice mail system 50 and the VMRAS 200, the session manager 400 performs user authentication 20 (FIG. 1C), navigates through the voice prompts 30 of the voice mail system 50, and extracts the voice mail messages 10 using the message parser 500. The message parser 500 uses well known speech recognition and natural language processing technologies to recognize the prompts and extract the voice mail messages 10 from the audio stream.

The client computers (Client 1 through the web server 251, Client 2 through the e-mail server 252, and Client 3 directly) send voice control commands 901 (FIG. 4) for interaction with the voice mail system 50 in the form of voice control packets 201 to the VMRAS 200. In return, the VMRAS 200 sends voice messages 10 in the form of voice data packets 204 to the client computers (Client 1 through the web server 251 and Client 2 through the e-mail server 252). If the connection 102 (see FIG. 2A) is over a data network, the VMRAS sends commands to the voice mail system 50 in the form of signal packets 202 and in return obtains voice messages in the form of audio packets 203 from the voice mail system 50. If the connection 102 (see FIG. 2A) is over the telephone network, the VMRAS 200 sends commands to the voice mail system 50 in the form of DTMF signals and in return obtains voice messages 10 as an audio stream over the telephone.

Figure 4:
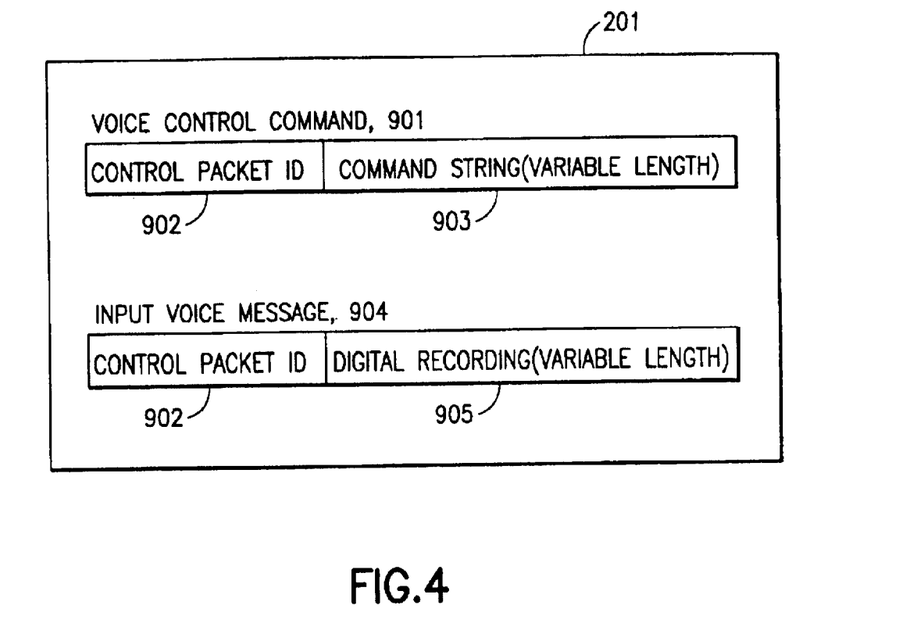
FIG. 4 is a block diagram of a voice control packet used by client computers to communicate voice mail commands to the VMRAS.

FIG. 4 shows the specification of a voice control packet 201 used by the client computers to send commands to the VMRAS 200 over the data network interface 291. For example, record messages 275 (in FIG. 2D) is sent as an input voice message 904 within the voice control packet 201. A voice control packet consists of a voice control command 901 comprising a control packet identification number 902 followed by a variable length command string 903 and/or an input voice message 904 comprising of a control packet identification number 902 followed by a variable length digital voice recording 905 or a text message. The control packet identification number 902 is typically a long integer used to uniquely identify a voice control command 901 or an input voice message 904 but can be any other type of identifier. This number 902 can be used to encode the packets for the communication protocol being used (e.g., TCP/IP, UDP, etc.). Possible values of the command string 903 are voice mail system commands, user commands or selections for the voice mail system and/or user profiles. Examples of voice control commands 903 are: "connect", "disconnect", "go to next", "go to previous", "receive all messages", etc. The digital recording 905 is typically a variable length compressed or uncompressed audio file using known techniques.

Figure 5:
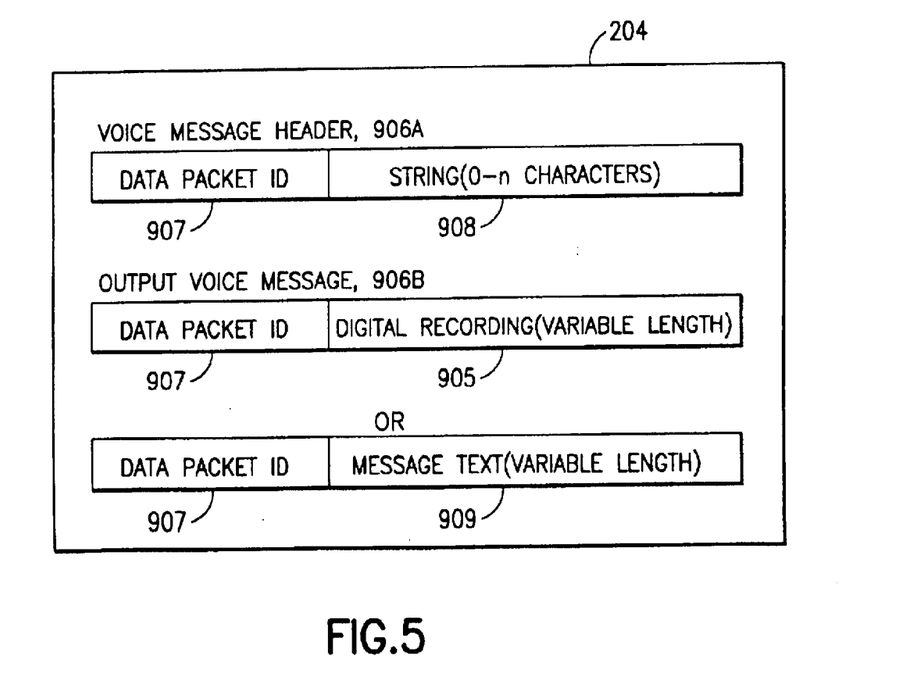
FIG. 5 is a block diagram of a voice data packet used by the VMRAS to communicate voice mail messages to the client computers.

FIG. 5 shows the specification of a voice data packet 204 used by the VMRAS to communicate voice messages (over the data network interface 291) to client computers where the users access voice mail using the stand alone voice mail player 803 (FIG. 2D). The information provided in the interface 803, (e.g., 271–275) is communicated in the packet 204. For example the retrieved messages 273 would be communicated in block 905. A voice data packet 204 comprises a voice message header 906A with a data packet identification number 907 and a variable length string 908 followed by an output voice message 906B having a data packet identification number 907 followed by a variable length digital recording 905 or a variable length text message 909. The data packet identification number 907 is typically a long integer (or any other identifier) used to uniquely identify a voice message header 906A or an output voice message 906B. The variable length string 908 contains information about the voice mail messages. Examples of the variable length string 908 include an e-mail header, a message timestamp, a message caller-id (using well known technology), the position of a particular message in a queue of messages, a list of messages for selection by the user, etc. The digital recording 905 is typically a compressed or uncompressed audio file and the message text 909 is a textual transcription of the voice mail message (if the voice mail system supports it).

For client computers where users are accessing their voice mail through their web browser 221, the voice data packets 204 are in the hyper text markup language (HTML) with embedded audio files (e.g., in wav or realaudio format). For client computers where users are accessing their voice mail through e-mail, the voice data packets 204 are in the standard SMTP or other mail format with the audio files being sent as attachments. Both the HTML and SMTP are well known.

Figure 6:
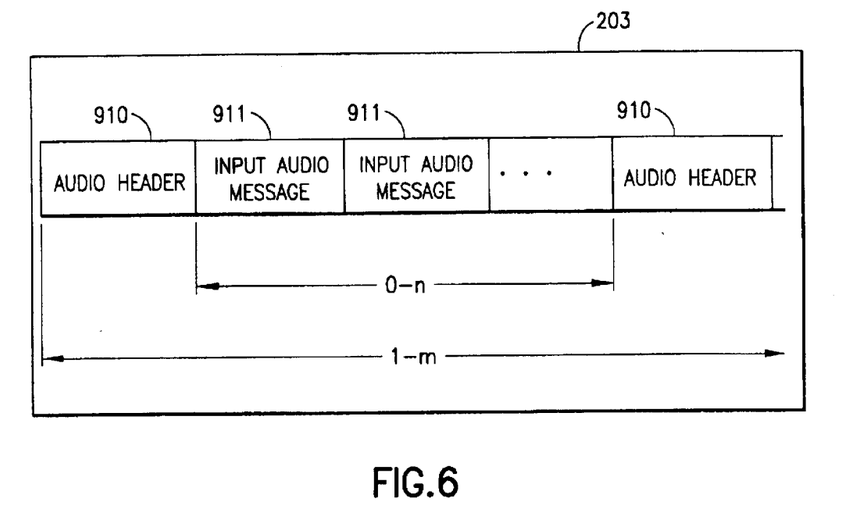
FIG. 6 is a block diagram of an audio packet used by the voice mail system to send voice mail messages to the VMRAS.

FIG. 6 shows the format of audio packets 203 used by the voice mail system 50 to communicate with the VMRAS 200 over the voice messaging interface 292. If the connection 102 between the VMRAS 200 and the voice mail system 50 (see FIG. 2A) and the voice messaging interface 492 is over a data network using a direct access API or a data network (e.g., using TCP/IP over a computer network or internet), the audio headers include information related to the communications protocol being used. Otherwise, the whole audio packet 203 is an audio stream over the telephone. An audio packet consists of a sequence of audio headers 910 followed by audio messages 911. The audio headers 910 contain voice prompts 30 played by the voice mail system (see FIG. 1C) or file descriptors for audio files containing voice recordings or structural information (e.g., file type, file length etc.) about audio files containing voice recordings. The input audio messages 911 are the voice messages played by the voice mail system 50. Examples of audio messages 911 include audio files containing voice recordings in compressed or uncompressed form.

Figure 7:
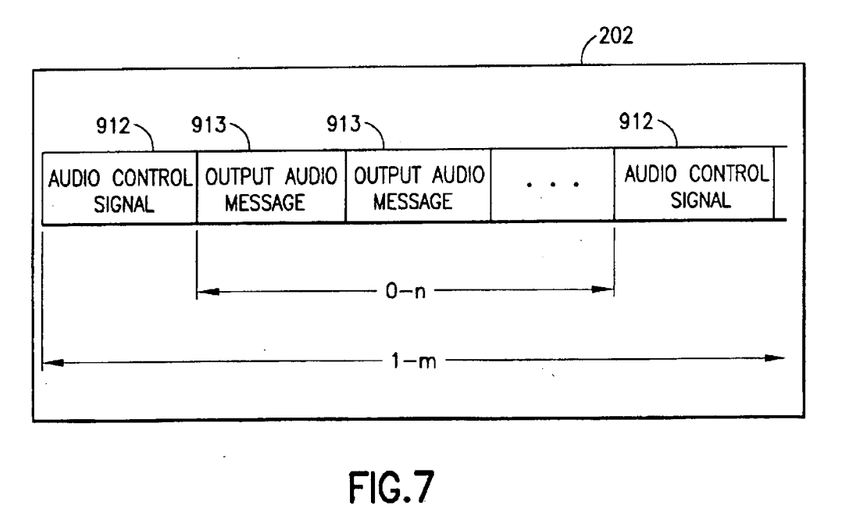
FIG. 7 is a block diagram of a signal packet used by the VMRAS to send voice mail commands and voice mail messages to the voice mail system.

FIG. 7 shows the format of a signal packet 202 used by the VMRAS to communicate voice mail commands to the voice mail system 50 over the voice messaging interface 292. If the connection 102 between the VMRAS 200 and the voice mail system 50 (see FIG. 2A) is over a voice messaging interface 292 using a direct access API (e.g., using TCP/IP over the internet), the audio control signals 912 include information about the communications protocol being used, and the output audio messages 913 are digitized audio files (e.g., in wav or realaudio format) containing the voice mail messages 10 recorded by users for others. If the voice messaging interface 292 is a telephone network, the whole signal packet 202 comprises dual-tone multi frequency (DTMF) tones and audio recordings representing voice mail commands or telephony server file management commands. If the voice messaging interface 492 is a digital data network, a signal packet 202 comprises a sequence of audio control signals 912 and output audio messages 913 in the order shown in FIG. 7. The audio control signals include commands to the voice mail system to navigate through the voice prompts 30 (FIG. 1C), i.e. DTMF tones. The output voice messages 913 typically are audio streams containing the voice messages recorded by users. Examples of an output voice message 913 include a text e-mail message, an audio attachment to an e-mail message, a pager command, a compressed or uncompressed audio stream.

Figure 8:
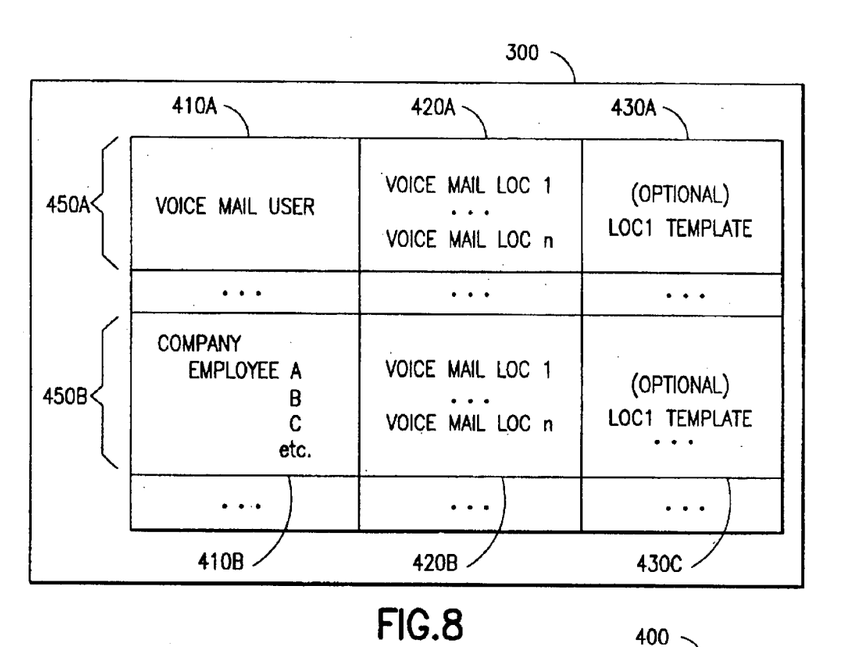
FIG. 8 is a block diagram of a user's registry within the VMRAS.

FIG. 8 is a block diagram describing the general layout of the users registry 300 within the VMRAS. Some of the embodiments could be organized as a flat file or as a database such that there is one record for each user 450A or company 450B. A company in this case is defined as a group of one or more users with a common set of voice mail locations.

The single user record 450A comprises the user identification 410A (such as her name), one or more voice mail locations and phone numbers 420A, and an optional entry specifying the phone mail locations templates 430A. The templates define the menus and selection options that the user has when listening to her voice mail messages.

The company record 450B comprises the company's name, and a list of its employees 410B that are authorized to use the voice mail system, along with a list of voice mail locations 420B and, optionally, a list of location templates 430C.

Figure 9:
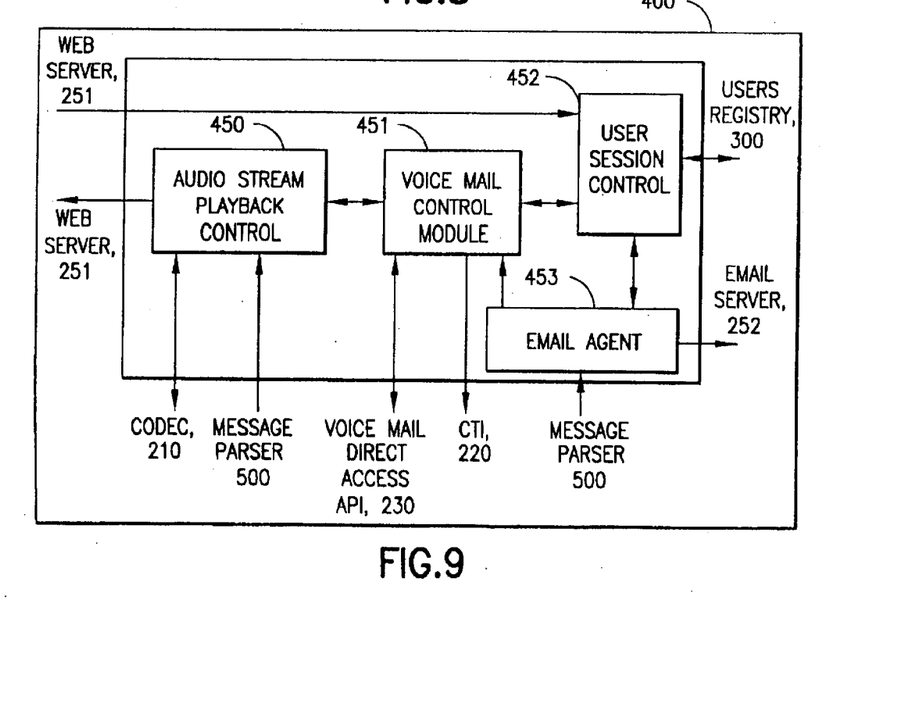
FIG. 9 is a block diagram of a session manager within the VMRAS.

FIG. 9 is a block diagram of the session manager 400 within a VMRAS 200. When a user tries to access her voice mail using her web browser (FIG. 2B) or a stand alone voice mail player application 803 (FIG. 2D), the client computer (Client 1 or Client 3) sends a voice control packet 201 to the VMRAS 200 asking it to open a voice mail session 40 (see FIG. 1C). The user session control unit 452 within the session manager 400 receives the voice control packet 201. The user session control unit 452 accesses the user's authentication information 410A (e.g., the user name and password as shown in FIG. 1C) and the location 420A (phone number of IP address) of the user's voice mail server 50, from the users registry 300, authenticates the user (e.g., verifies the password) and activates the voice mail control module 451. The voice mail control module 451 establishes communication 102 (see FIG. 2A) with the user's voice mail system 50 either over the telephone network through the CTI 220 or using the voice mail direct access API 230. If the communication 102 is over the telephone network, the CTI unit 220 calls the voice mail system 50, and sends the audio response from the voice mail system to the message parser 500. The message parser 500 extracts the voice mail messages 10 (the extraction process is explained in detail later, see FIG. 10), if any, of the user, and sends them as an audio stream to the audio stream playback control unit 450 in the session manager 400. If the communication between the VMRAS 200 and voice mail system 50 is through the voice mail direct access API 230, the voice messages 10 are directly sent from the voice mail server 50 to the voice mail control module 451, which in turn sends the messages 10 to the audio stream playback control 450. The audio stream playback control unit 450 formats the audio data of the voice messages using the codec 210 and sends voice data packets 204 (as HTML for web users) containing the extracted voice messages 10 to the web server 251 (for web users) or Client 3 (for users using a stand alone voice mail player application 803). The voice mail plug-in 801 on Client 1 or the voice mail player application 803 on Client 3 enable the user to access her voice mail (through her web browser 221 for Client 1) and listen to her voice messages 10 over the speakers of her computer.

If the user is accessing her voice mail through her e-mail, the e-mail agent 453 in the session manager 400 within VMRAS 200 periodically checks the user's voice mail from the voice mail system 50. For example, every twenty minutes, the e-mail agent 453 (FIG. 9) looks up information (410 and 420, see FIG. 8) about users using e-mail from the user's registry 300 through the user session control 452. The user session control 452 activates the voice mail control module 451, which uses either the voice mail direct access API 230 or the CTI 220 and the message parser 500 to extract voice messages 10, as described above.

In this case, the extracted messages 10 are sent to the e-mail agent 453 which sends e-mail messages (e.g., using SMTP protocol) in the form of voice data packets 204 to the e-mail server. The voice mail player add-in 802 enables the e-mail client on Client 2 to playback the voice messages 10 through the speakers of her computer.

Figure 10:
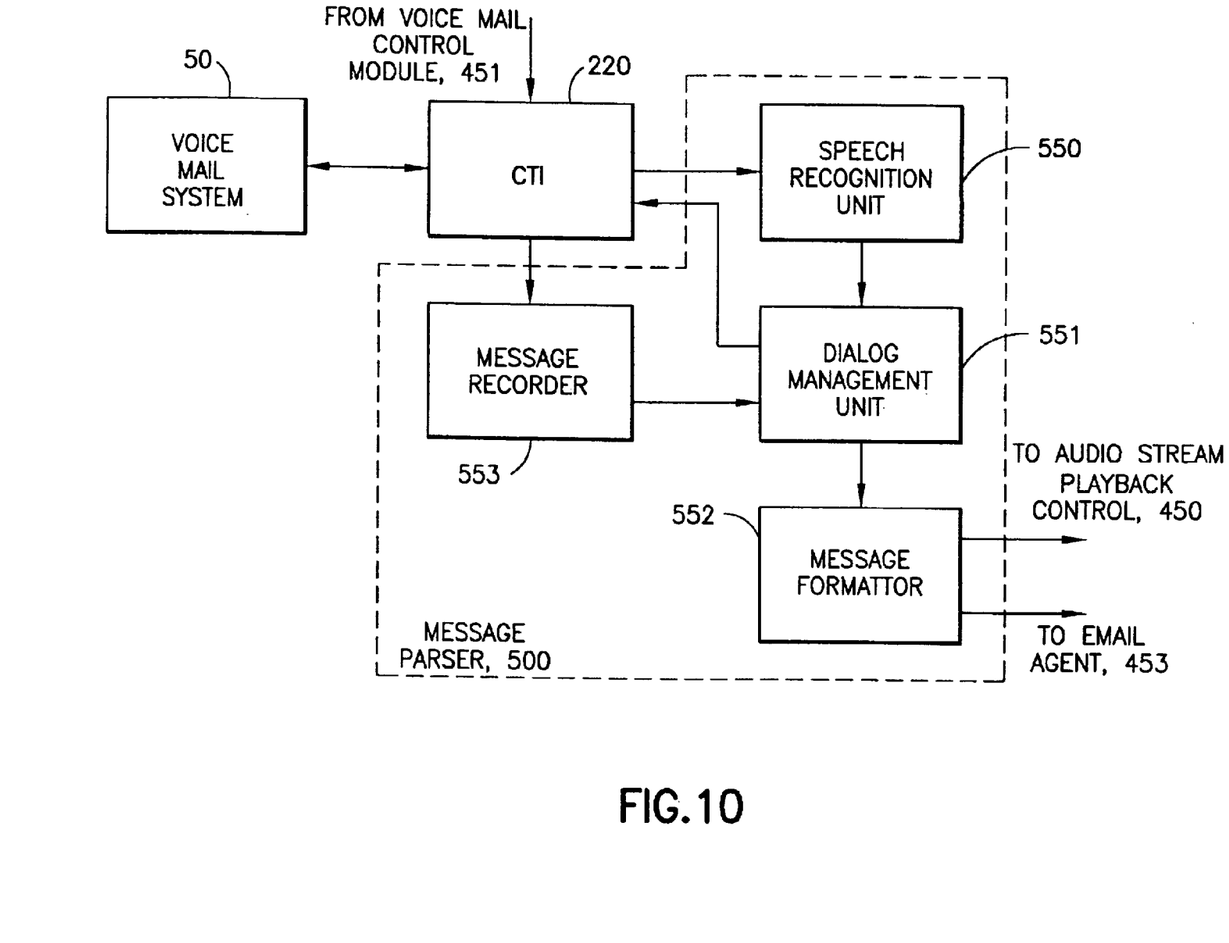
FIG. 10 is a block diagram of a message parser within the VMRAS.

FIG. 10 shows a block diagram of a message parser 500. The CTI unit 220 receives instructions from the voice mail control module 451 in the session manager 400 to extract a user's voice mail from a voice mail server 50. The CTI sends all audio output from the voice mail system 50 to the speech recognition unit 550 within the message parser 500. The speech recognition unit 550 uses well known speech recognition technology (e.g., using IBM Via Voice or the Dragon speech recognition system) to recognize the response from the voice mail system 50 as voice prompts 30. The recognized voice prompts 30 (e.g., see FIG. 1C) are sent to the dialog management unit 551 by the speech recognition unit 550. The dialog management unit 551 employs standard known natural language processing technology (e.g., see the text "Natural language processing, a knowledge engineering approach", by Richard Cullingford, Rowman & Littlefield 1986, which is herein incorporated by reference in it entirety) to understand the voice mail prompts 30, and extract prompt strings from the audio stream played by the voice mail system 50. Examples of a prompt string include a number denoting the position of a voice message in a stream of messages, a timestamp representing the time of recording of a message, a telephone number, an extension of a person or a person's name representing the caller-id (well known technology) etc. The dialog management unit 551 instructs the CTI unit 220 to generate DTMF keys as necessitated to navigate through the voice prompts 30 (e.g., as shown in FIG. 1C) until the voice mail messages 10 are played by the voice mail system 50. For instance, upon initiation of a call with the voice mail system 50, the dialog management unit 551 determines the exact timing in the conversation, when it is appropriate to play the user's name and password to the voice mail system for authentication 20 purposes (e.g., as shown in FIG. 1C). This playback (interspersed appropriately with DTMF tones) is performed by the CTI unit 220 when instructed by the dialog management unit 551. After user authentication 20 with the voice mail system 50, the dialog management unit 551 analyzes the next prompt 30 (FIG. 1C) played by the voice mail system. If the prompt 30 is "you have no new messages", the dialog management unit 551 understands it and asks the CTI unit 220 to terminate the call with the voice mail system 50, after sending an appropriate e-mail message to the e-mail agent 453 or the audio stream from the voice mail system 50 depending upon the method of access. If the prompt 30 from the voice mail system 50 is "you have 7 new messages", the dialog management unit 551 navigates through the prompts of the voice mail system 50 by instructing the CTI unit 220 to send appropriate DTMF tones, until the first message 10 (e.g., see FIG. 1C) is about to be played. The dialog management unit 551 then instructs the CTI unit 220 to record the audio stream of the voice mail system 50 by sending instructions to a message recorder 553. The message recorder 553 records all the output of the voice mail system using known technology (e.g., the voice recording capability in CTI products like the IBM DirectTalk/6000 product), until instructed to stop by the dialog management unit 551 (through the CTI unit 220). The recorded voice mail messages 10 are sent to the dialog management unit 551, which in turn sends them to the message formatter 552. The message formatter 552 formats the voice mail messages 10 either

- as an audio stream, or an HTML message (depending upon the users method of access), and sends it to the audio stream playback control 450 in the session manager 400, or
- as an e-mail message with an attachment and sends it to the e-mail agent 453 in the session manager 400.

The above steps are repeated until all the voice messages of the user are extracted.

We claim:

1. A computer system having one or more central processing units and one or more memories, comprising;
    one or more data network interfaces capable of two way communications with one or more data networks, where each of the data network interfaces is capable of receiving one or more voice control packets, each voice control packet having one or more voice control commands and zero or more input voice messages, each of the data network interfaces further capable of sending one or more voice data packets, each voice data packet having zero or more output voice messages and zero or more voice message headers associated with the respective output voice messages;
    one or more voice messaging interfaces capable of two way communications over one or more network connections to one or more voice mail systems, each of the voice messaging interfaces capable of receiving one or more audio packets from said one or more voice mail systems, each of the audio packets having zero or more input audio messages and at least one audio header, each of the network connections further capable of sending one or more signal packets, each of the signal packets having one or more audio control signals and zero or more output audio message, said at least one audio header containing at least one voice prompt played by said one or more voice mail systems; and
    a session manager process, executed by one or more of the central processing units, convening one or more of the audio packets into one of the voice data packets and sending the voice data packet through the data network interface to one or more of the data networks, and the session manager process further converting one or more of the voice control packets into one or more signal packets and sending the signal packets through the voice messaging interface to one or more of the networks, said session manager process employing continuous speech recognition and natural language understanding technologies to parse said audio header, extract said at least one voice prompt played by said one or more voice mail systems, and generate control command signals for navigating the at least one voice prompt.

2. A computer system, as in claim 1, where one or more of the voice messaging interface connects to one of the following networks: a telephony network, a digital network connected to a telephony server, a digital IP network connected to a telephony server, a dedicated RS-232 connection to a telephony server, a synchronous or asynchronous data communication network connected to a telephony server.

3. A computer system, as in claim 1, where the audio packet has one or more input voice messages that are telephone voice messages and further has one or more audio headers that are telephone message system prompts.

4. A computer system, as in claim 1, where the audio packet has one or more input voice messages that are voice recording files and further has one or more audio headers that are file descriptors.

5. A computer system, as in claim 4, where one or more of the audio headers contains structural information about the voice recording files.

6. A computer system, as in claim 1, where one or more of the output voice messages is one of the following: a text e-mail message, an audio attachment to an e-mail message, a pager message and a compressed audio stream.

7. A computer system, as in claim 1, where one or more of the voice message header is one of the following: an email header, a message time stamp, a message caller-id, message order in the queue, a message delivery status, a selection list and a compressed audio stream.

8. A computer system, as in claim 1, where the voice control commands of one or more of the voice control packets ate any one of the following: a user command or selection, a user profile and a voice mail system command.

9. A computer system, as in claim 1, where the input voice message of one or more of the voice control packets is any one of the following: a digitized voice message recording and a text message.

10. A computer system, as in claim 1, where the signal packet is in any one of the following formats: a DTMF signal, an audio recording, a telephony server file management command, and a voice mail system command.

11. A computer system, as in claim 1, where the session manager uses a message parsing logic to recognize a prompt string in one or more of the audio headers, produces zero or more voice message headers based on the prompt string, and converting the audio message into an output voice message based on the prompt string.

12. A computer system, as in claim 11, where the prompt string is a numeric value representing a number of audio messages, the voice message header produced is a playback of the audio headers and the output voice messages is a playback of the respective audio messages.

13. A computer system, as in claim 11, where the prompt string is a time stamp representing a received time of the input audio messages, the voice message header produced is a header field that is attached to the output voice message.

14. A computer system, as in claim 11, where the prompt string is a telephone number, an extension or a person's name representing the caller id, the voice message header produced is a header field that is attached to the output voice message.

15. A computer system its in claim 1, wherein said session manager processes a plurality of said voice prompts played by said one or more voice mail systems to extract a voice message from said one or more voice mail systems.

16. A computer system as in claim 1, wherein a synchronous connection allows a user to listen to said voice message in real-time.

17. A computer system as in claim 1, wherein an asynchronous connection allow a user to receive said voice messages as an e-mail attachment.

18. A session manager process, executed by one or more central processing units, comprising the steps of:

converting one or more audio packets into one or more voice data packets and sending the voice data packets through a data network interface to one or more data networks, said audio packets having at least one audio header, said at least one audio header containing at least one voice prompt played by one or more voice mail systems, and wherein said session manager process employs continuous speech recognition and natural language understanding technologies to parse said audio header, extract at least one voice prompt played by said one or more voice mail systems, and generate control command signals for navigating the at least one voice prompt; and converting one or more voice control packets into one or more signal packets and sending the signal packets through a voice messaging interface to one or more networks.

19. A computer system comprising:

means for converting one or more audio packets into one or more voice data packets and sending the voice data packets through a data network interface to one or more data networks, said audio packets having at least one audio header, said at least one audio header containing at least one voice prompt played by one or more voice mail systems, and wherein said computer system further comprises means for employing continuous speech recognition and natural language understanding technologies to parse said audio header, extract at least one voice prompt played by said one or more voice mail systems, and generate control command signals for navigating the at least one voice prompt; and means for converting one or more of the voice control packets into one or more signal packets and sending the signal packets through a voice messaging interface to one or more networks.

20. A method of accessing voice mail from a remote voice mail system for delivery to a terminal connected to a data network, comprising the steps of:

establishing a connection to said remote voice mail system;

receiving at least one voice prompt played by said remote voice mail system;

employing continuous speech recognition and natural language understanding technologies to parse said at least one voice prompt played by said remote voice mail system;

sending a control command to said remote voice mail system in response to said at least one voice prompt to navigate said at least one voice prompt; and receiving a voice mail message from said remote voice mail system converting the voice mail message into voice data communications;

delivering the voice data communications to the terminal through the data network.

21. The method of claim 20, wherein said connection is over a data network.

22. The method of claim 20, wherein said connection is over a telephone network.

23. The computer system of claim 1, wherein said control command signals are DTMF signals.

* * * * *

UNITED STATES PATENT AND TRADEMARK OFFICE
CERTIFICATE OF CORRECTION

PATENT NO. : 6,704,394 B1
DATED : March 9, 2004
INVENTOR(S) : Kambhatla et al.

It is certified that error appears in the above-identified patent and that said Letters Patent is hereby corrected as shown below:

Column 10,
Line 56, before "any" and after "packets" replace "ate" with -- are --.

Column 12,
Line 34, after "prompt;" delete -- and --.
Line 36, after "system" insert -- ; --.
Line 36, before "converting" insert a break, making "converting the voice mail message into voice data communications; and" into a separate step of the claim.
Line 37, after "communications;" insert -- and --.

Signed and Sealed this

Twenty-seventh Day of September, 2005

JON W. DUDAS
*Director of the United States Patent and Trademark Office*